(12) United States Patent
Byrd

(10) Patent No.: US 11,423,053 B2
(45) Date of Patent: Aug. 23, 2022

(54) LOG EVENT CLUSTER ANALYTICS MANAGEMENT

(71) Applicant: ENTIT SOFTWARE LLC, Sanford, NC (US)

(72) Inventor: Christopher Byrd, New Milford, CT (US)

(73) Assignee: MICRO FOCUS LLC, Santa Clara, CA (US)

( * ) Notice: Subject to any disclaimer, the term of this patent is extended or adjusted under 35 U.S.C. 154(b) by 210 days.

(21) Appl. No.: 16/071,767

(22) PCT Filed: Jan. 30, 2016

(86) PCT No.: PCT/US2016/015848
§ 371 (c)(1),
(2) Date: Jul. 20, 2018

(87) PCT Pub. No.: WO2017/131791
PCT Pub. Date: Aug. 3, 2017

(65) Prior Publication Data
US 2019/0034517 A1 Jan. 31, 2019

(51) Int. Cl.
*G06F 16/28* (2019.01)
*G06F 17/40* (2006.01)
(Continued)

(52) U.S. Cl.
CPC ........ *G06F 16/285* (2019.01); *G06F 11/3476* (2013.01); *G06F 16/2379* (2019.01); *G06F 17/40* (2013.01)

(58) Field of Classification Search
CPC .... G06F 16/285; G06F 11/3476; G06F 17/40; G06F 16/2379
See application file for complete search history.

(56) References Cited

U.S. PATENT DOCUMENTS 6,049,797 A * 4/2000 Guha ................... G06K 9/6218
7,321,992 B1 * 1/2008 Vellore ................. G06F 11/004
714/13
(Continued)

FOREIGN PATENT DOCUMENTS

WO WO2007016412 A2 2/2007

OTHER PUBLICATIONS

Folino, et al; Methods and Techniques for Discovering Taxonomies of Behavioral Process Models, Sep. 2011, 20 pgs.
(Continued)

*Primary Examiner* — Ashish Thomas
*Assistant Examiner* — Yohanes D Kelemework

(57) ABSTRACT

A log event cluster analytics management method may involve storing a first portion of an entire cluster dictionary in a transient memory, storing at least a second portion of the entire cluster dictionary in a persistent database and comparing a new log event message to the first portion of the overall cluster dictionary. In response to not assigning the new log event message to any cluster in the first portion of the entire cluster dictionary in the transient memory, selecting a subset of clusters of the at least second portion of the cluster dictionary in the persistent database, comparing the new log event message to a cluster of the selected subset of clusters and assigning the new log event message to the cluster of the selected subset of clusters based upon the comparison.

19 Claims, 11 Drawing Sheets

(51) Int. Cl.
  *G06F 11/34* (2006.01)
  *G06F 16/23* (2019.01)

(56) References Cited

U.S. PATENT DOCUMENTS

| | | |
|---|---|---|
| 8,209,567 B2 | 6/2012 | Cohen et al. |
| 2004/0221149 A1* | 11/2004 | Rao .................. H04L 67/10 713/2 |
| 2010/0037009 A1* | 2/2010 | Yano .................. G06F 3/0679 711/103 |
| 2010/0153397 A1 | 6/2010 | Barabas |
| 2010/0290601 A1 | 11/2010 | Chen et al. |
| 2011/0185234 A1* | 7/2011 | Cohen .................. G06F 16/285 714/37 |
| 2013/0042147 A1 | 2/2013 | Tonouchi |
| 2014/0164376 A1* | 6/2014 | Yang .................. G06F 16/355 707/737 |
| 2014/0334739 A1 | 11/2014 | Umanesan |
| 2014/0344540 A1* | 11/2014 | Bish .................. G06F 11/1464 711/162 |
| 2015/0370799 A1 | 12/2015 | Kushmerick |
| 2015/0370885 A1* | 12/2015 | Kushmerick .......... G06F 16/353 707/737 |
| 2016/0034525 A1* | 2/2016 | Neels .................. G06F 16/285 707/737 |
| 2016/0196163 A1* | 7/2016 | van Gulik .............. G06F 9/466 718/102 |
| 2016/0350192 A1* | 12/2016 | Doherty ................ G06F 3/0665 |

OTHER PUBLICATIONS

International Searching Authority., International Search Report and Written Opinion dated Oct. 28, 2016 for PCT Application No. PCT/US2016/015848 Filed Jan. 30, 2016; 13 pages.

Mishra and Kumar, Clustering Web Logs using Similarity Upper Approximation with Different Similarity Measures, Jun. 2012, International Journal of Machine Learning and Computing vol. 2 No. 3 3 pgs.

Ning, et al, HLAer A System for Heterogeneous Log Analysis, Sep. 13, 2013, 22pgs.

* cited by examiner

| | | 100 106 |
|---|---|---|
| 104 | 105 | |
| 1 | 2008-02-06 14:35:16 | UNEXPECTED FAILURE WHILE TRYING TO PING USER SESSION #55555 THE SESSION AUTHENTICATION HAS FAILED |
| 1 | 2008-02-06 14:35:17 | FAILED TO RETRIEVE THE META DATA OF PROJECT 'NULL0' THE SESSION AUTHENTICATION HAS FAILED |
| 1 | 2008-02-06 14:35:19 | FAILED TO GET LICENSES FOR PROJECT SESSION THE SESSION AUTHENTICATION HAS FAILED |
| 1 | 2008-02-06 14:35:19 | ERROR PROCESSING REQUEST FROM 192.111.22.33 DATA STARTS WITH 0\00000023\0 CONSTSTR DOWNLOAD |
| 2 | 2008-02-06 14:35:39 | UNEXPECTED FAILURE WHILE TRYING TO PING USER SESSION #44444 THE SESSION AUTHENTICATION HAS FAILED |
| 2 | 2008-02-06 14:35:40 | FAILED TO RETRIEVE THE META DATA OF PROJECT 'NULL1' THE SESSION AUTHENTICATION HAS FAILED |
| 2 | 2008-02-06 14:35:41 | UNEXPECTED FAILURE WHILE TRYING TO PING USER SESSION #33333 THE SESSION AUTHENTICATION HAS FAILED |
| 2 | 2008-02-06 14:35:41 | FAILED TO GET LICENSES FOR PROJECT SESSION THE SESSION AUTHENTICATION HAS FAILED |
| 3 | 2008-02-06 14:50:08 | FAILED TO GET LICENSES FOR PROJECT SESSION THE SESSION AUTHENTICATION HAS FAILED |
| 3 | 2008-02-06 14:50:09 | ERROR PROCESSING REQUEST FROM 192.111.22.33 DATA STARTS WITH 0\00000014\0 CONSTSTR DOWNLOAD |
| 2 | 2008-02-06 14:50:11 | FAILED TO RETRIEVE THE META DATA OF PROJECT 'NULL3' THE SESSION AUTHENTICATION HAS FAILED |
| 3 | 2008-02-06 14:50:14 | ERROR PROCESSING REQUEST FROM 192.111.22.33 DATA STARTS WITH 0\00000512\0 CONSTSTR DOWNLOAD |

| 1 | 2008-02-06 14:35:16 | UNEXPECTED FAILURE WHILE TRYING TO PING USER SESSION #55555 THE SESSION AUTHENTICATION HAS FAILED |
| 2 | 2008-02-06 14:35:39 | UNEXPECTED FAILURE WHILE TRYING TO PING USER SESSION #44444 THE SESSION AUTHENTICATION HAS FAILED |
| 3 | 2008-02-06 14:35:41 | UNEXPECTED FAILURE WHILE TRYING TO PING USER SESSION #33333 THE SESSION AUTHENTICATION HAS FAILED |

107

| 1 | 2008-02-06 14:35:17 | FAILED TO RETRIEVE THE META DATA OF PROJECT 'NULL0' THE SESSION AUTHENTICATION HAS FAILED |
| 2 | 2008-02-06 14:35:40 | FAILED TO RETRIEVE THE META DATA OF PROJECT 'NULL1' THE SESSION AUTHENTICATION HAS FAILED |
| 3 | 2008-02-06 14:50:11 | FAILED TO RETRIEVE THE META DATA OF PROJECT 'NULL3' THE SESSION AUTHENTICATION HAS FAILED |

107

| 1 | 2008-02-06 14:35:19 | FAILED TO GET LICENSES FOR PROJECT SESSION THE SESSION AUTHENTICATION HAS FAILED |
| 2 | 2008-02-06 14:35:41 | FAILED TO GET LICENSES FOR PROJECT SESSION THE SESSION AUTHENTICATION HAS FAILED |
| 3 | 2008-02-06 14:50:08 | FAILED TO GET LICENSES FOR PROJECT SESSION THE SESSION AUTHENTICATION HAS FAILED |

107

| 1 | 2008-02-06 14:35:19 | ERROR PROCESSING REQUEST FROM 192.111.22.33 DATA STARTS WITH 0\00000023\0 CONSTSTR DOWNLOAD |
| 2 | 2008-02-06 14:50:09 | ERROR PROCESSING REQUEST FROM 192.111.22.33 DATA STARTS WITH 0\00000014\0 CONSTSTR DOWNLOAD |
| 3 | 2008-02-06 14:50:14 | ERROR PROCESSING REQUEST FROM 192.111.22.33 DATA STARTS WITH 0\00000512\0 CONSTSTR DOWNLOAD |

FIG. 4

| 700 | 440 | |
|---|---|---|
| 2008-02-06 14:35:16 | UNEXPECTED FAILURE WHILE TRYING TO PING USER SESSION #5555 THE SESSION AUTHENTICATION HAS FAILED | A |
| 2008-02-06 14:35:17 | FAILED TO RETRIEVE THE META DATA OF PROJECT 'NULL0' THE SESSION AUTHENTICATION HAS FAILED | B |
| 2008-02-06 14:35:19 | FAILED TO GET LICENSES FOR PROJECT SESSION THE SESSION AUTHENTICATION HAS FAILED | C |
| 2008-02-06 14:35:19 | ERROR PROCESSING REQUEST FROM 192.111.22.33 DATA STARTS WITH 0\00000023\0 CONSTSTR DOWNLOAD | D |
| 2008-02-06 14:35:39 | UNEXPECTED FAILURE WHILE TRYING TO PING USER SESSION #44444 THE SESSION AUTHENTICATION HAS FAILED | A |
| 2008-02-06 14:35:40 | FAILED TO RETRIEVE THE META DATA OF PROJECT 'NULL1' THE SESSION AUTHENTICATION HAS FAILED | B |
| 2008-02-06 14:35:41 | FAILED TO GET LICENSES FOR PROJECT SESSION THE SESSION AUTHENTICATION HAS FAILED | C |
| 2008-02-06 14:35:41 | UNEXPECTED FAILURE WHILE TRYING TO PING USER SESSION #33333 THE SESSION AUTHENTICATION HAS FAILED | A |
| 2008-02-06 14:50:08 | ERROR PROCESSING REQUEST FROM 192.111.22.33 DATA STARTS WITH 0\00000014\0 CONSTSTR DOWNLOAD | D |
| 2008-02-06 14:50:09 | FAILED TO RETRIEVE THE META DATA OF PROJECT 'NULL3' THE SESSION AUTHENTICATION HAS FAILED | B |
| 2008-02-06 14:50:11 | ERROR PROCESSING REQUEST FROM 192.111.22.33 DATA STARTS WITH 0\00000512\0 CONSTSTR DOWNLOAD | D |

FIG. 6

| 704 | 440 |
|---|---|
| 2008-02-06 14:35:16 | A |
| 2008-02-06 14:35:17 | B |
| 2008-02-06 14:35:19 | C |
| 2008-02-06 14:35:19 | D |
| 2008-02-06 14:35:39 | A |
| 2008-02-06 14:35:40 | B |
| 2008-02-06 14:35:41 | A |
| 2008-02-06 14:35:41 | C |
| 2008-02-06 14:50:08 | D |
| 2008-02-06 14:50:09 | B |
| 2008-02-06 14:50:11 | D |

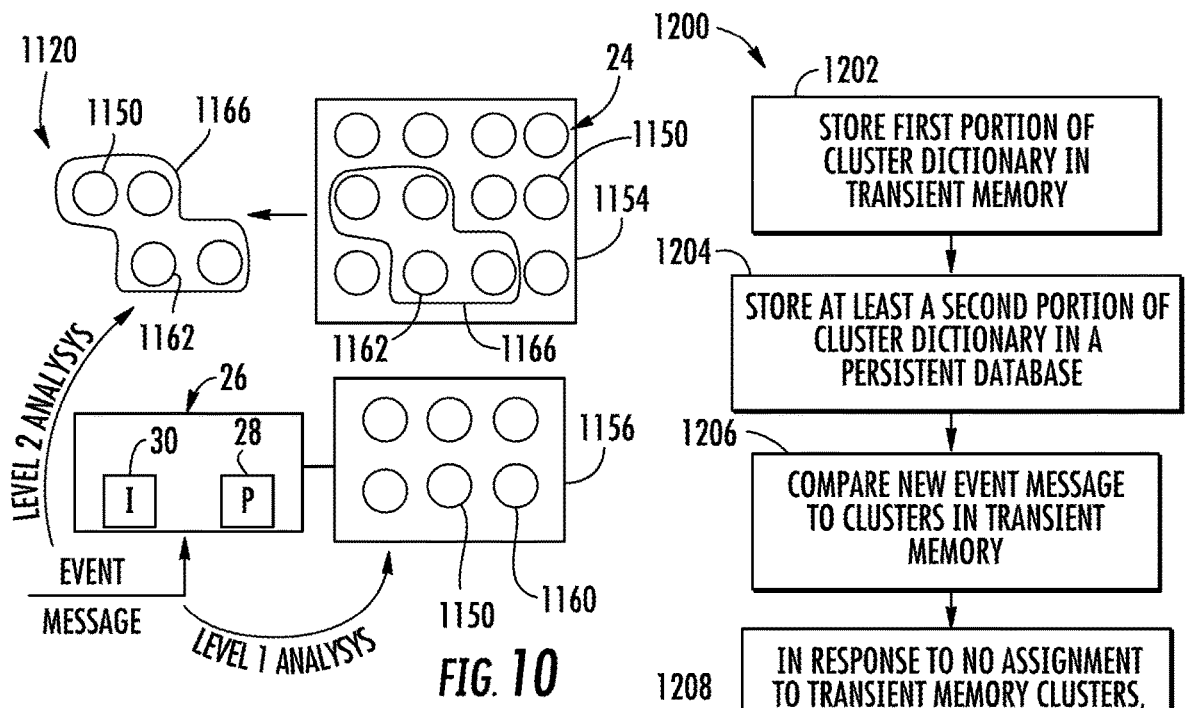
FIG. 10
FIG. 11
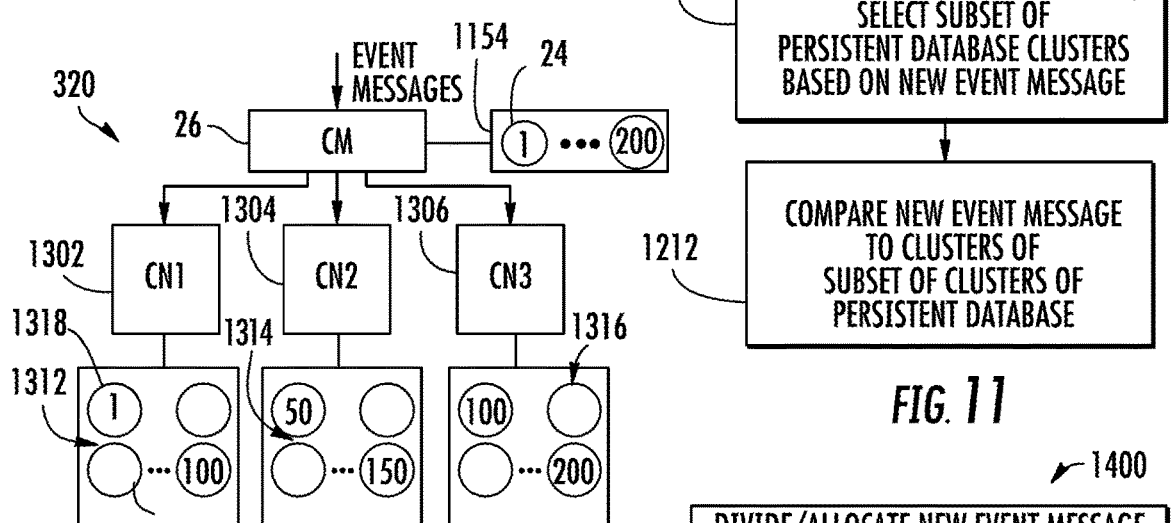
FIG. 12
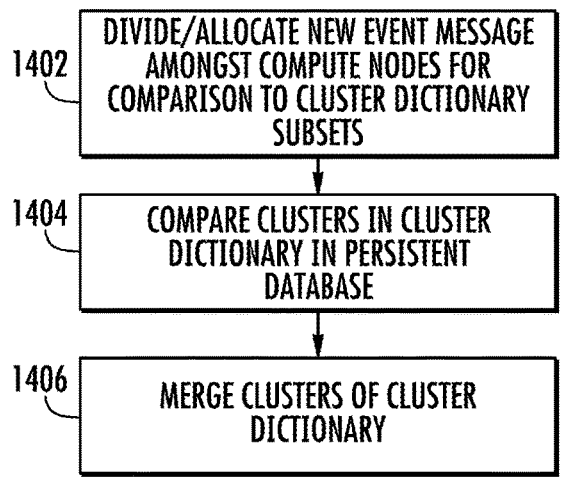
FIG. 13

LOG EVENT CLUSTER ANALYTICS MANAGEMENT

Computer systems are formed from multiple components, such as hardware components and programming components. Such components may generate and store human readable, textual event messages into system event log files or logs. These logs may be stored on network servers and may be usable in system development, debugging and understanding behavior of a system. Automated analysis of such logs of event messages may be used to diagnose computer system components.

BRIEF DESCRIPTION OF THE DRAWINGS

FIG. 3 is a table of example log event messages of a portion of an example computer system log file.

FIG. 4 is a table of the example log event messages of FIG. 3 after rearrangement.

FIG. 6 is a table of the example log event messages of FIG. 3 assigned into the example clusters of FIG. 5.

FIG. 7 is an example representation of a reduced log generated from the example message cluster assignments illustrated in FIG. 6.

FIG. 10 is a schematic diagram illustrating an example log event cluster analytics management system.

FIG. 11 is a flow diagram of an example method for managing analytics of log event clusters using multi-level cluster analysis.

FIG. 12 is a schematic diagram illustrating an example log event cluster analytics management system.

FIG. 13 is a flow diagram of an example method for managing analytics of log event clusters using distributed analysis and cluster merging.

DETAILED DESCRIPTION OF EXAMPLES

Traditional methods for automated analysis of such computer-generated event message logs may not be well suited for large-scale systems and networks, wherein the number of event message clusters may overwhelm available resources. Such traditional methods may consume large amounts of memory and processing time. For example, with some traditional methods, event messages may be arranged in clusters of related messages, wherein the entire dictionary of clusters is stored entirely in main memory of a single system and wherein a new event message is compared to each and every cluster, in an age-based sequence, until a match is found.

In contrast to such traditional systems, examples consistent with the present disclosure may facilitate analytics of computer-generated event message logs for large-scale systems and networks. As will be described hereafter, examples consistent with the present disclosure may implement the grouping of clusters into families, wherein the families themselves are analyzed in a predefined order so as to more quickly identify a match between existing clusters and an incoming event message.

Examples consistent with the present disclosure may additionally or alternatively store a portion of the total cluster dictionary in the transient memory of a computer node for initial faster analysis while maintaining a larger persistent storage database of the entire cluster dictionary, wherein a text search engine is used to identify those clusters in the persistent storage database for analysis should an incoming event message not match any of the clusters in the transient memory. As a result, the generally smaller transient memory may not contain the entire cluster dictionary.

In some implementations, examples consistent with the present disclosure distribute the analysis of incoming event messages amongst multiple computer nodes, each of the computer nodes having an associated transient memory storing a portion of the overall cluster dictionary; wherein the overall cluster dictionary is stored in the larger persistent storage. In such an example implementation, the system may merge sufficiently similar clusters in the persistent storage database, pursuant to a predefined similarity threshold, to eliminate redundant clusters in the database that are created by the different compute nodes. The merged clusters of the database are propagated to the transient memories. In one implementation, a text search engine is used to identify those clusters in the persistent storage database for analysis should an incoming event message not match any of the clusters in the transient memory of a particular computer node.

Figure 1:
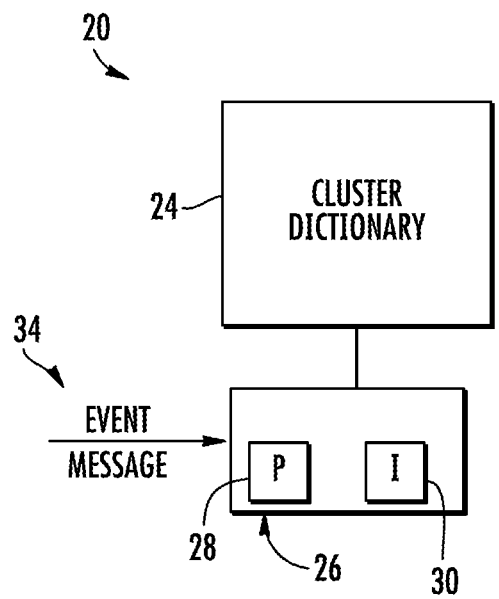
FIG. 1 is a schematic diagram of an example log event cluster analytics management system.

FIG. 1 schematically illustrates an example automated log event cluster analytics management system 20. As shown by FIG. 1, system 20 comprises cluster dictionary 24 and log event cluster analytics manager 26. Cluster dictionary 24 comprises clusters of log event messages (also known as logs) against which newly incoming log event messages are compared. In one implementation, cluster dictionary 24 comprises a master set or the entire set of clusters to be compared to a new event message for assignment. In one Implementation, cluster dictionary 24 is stored in a transient storage device, a volatile storage device, a device that maintains stored values while being powered, but may lose stored values when not powered, such as a random access memory. For example, in one implementation, cluster dictionary 24 is stored in the main memory, the transient memory, of a commodity server or the main memory of a desktop.

In another implementation, cluster dictionary 24 is stored in a persistent storage device, a nonvolatile device that maintains values in the absence of being powered, such as a disk storage. In contrast to a transient storage device which may have a maximum size on the order of gigabytes, a persistent storage device may have a maximum size on the order of terabytes or larger. In some implementations, the transient storage device may be distributed amongst multiple persistent storage device units which are sequentially accessed. In some implementations, the persistent storage device may serve as a backup storage for multiple individual transient storage devices or main memories associated with multiple computer nodes.

Log event cluster analytics manager 26 comprises a computer node comprising a processor 26 and stored instructions 30. Processor 26 comprises a processing unit (processing hardware) that follows instructions 30 provided in a non-transitory computer-readable medium or memory. For purposes of this application, computer node comprises both a processing unit and stored instructions. The term "processing unit" shall mean a presently developed or future developed processing unit or processing hardware that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other examples, hard wired circuitry may be used in place of or in combination with instructions to implement the functions described. For example, log event cluster analytics manager 26 may be embodied as part of one or more application-specific integrated circuits (ASICs).

Figure 2:
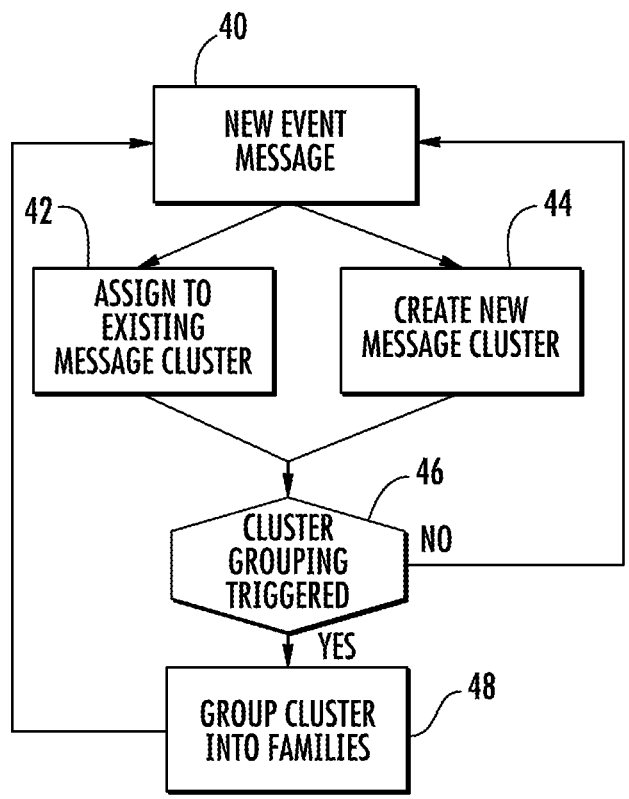
FIG. 2 is a flow diagram of an example method for managing analytics of log event message clusters.

FIG. 2 is a flow diagram illustrating an example of how log event cluster analytics manager 26 may create message clusters from incoming event messages and one example of how log event cluster analytics manager 26 may manage the analytics of a large number of message clusters that may accumulate over time from a large-scale system or network. As indicated by block 40, a new event message from an event log file or log is received. FIG. 3 illustrates an extract from an example log file 100 that may be received by log event cluster analytics manager 26. Logs comprise semi-structured events generated automatically when programming or hardware components output messages describing actions, warnings or errors during their operation. The illustrative portion from the example log file 100 includes including twelve individual events 104. An event 104 may have a timestamp 105, representing the date and time at which the programming generated the event, and at least a textual narrative 106 describing the event. In some events additional fields might appear (not shown), for example describing severity level, source method/function, etc.

Even though there are twelve events shown in the log file in the example of FIG. 3, four message templates have been used to generate the messages with ten distinct (i.e. completely different) messages. The four templates are illustrated in the re-arranged table shown in FIG. 4. The ten distinct messages result from variables 109 (i.e. numbers, words or and symbols) in the narrative 108 that have been inserted into the templates. In this example, the variables 109 in FIG. 4 are IP addresses, user session #, project names and conststr identifiers.

For the following purposes, each log event, e, is denoted by a tuple (t,msg), where t is the timestamp 105 of the message and msg is the message text 106, represented by the word vector msg=$w_1, w_2, \ldots, w_n$, where $w_i$ is the word in the i'th position, while n is the number of words in a message. Each $w_i$ represents a word from all the words present in the logs, and the set of log entries is E.

Figure 5:
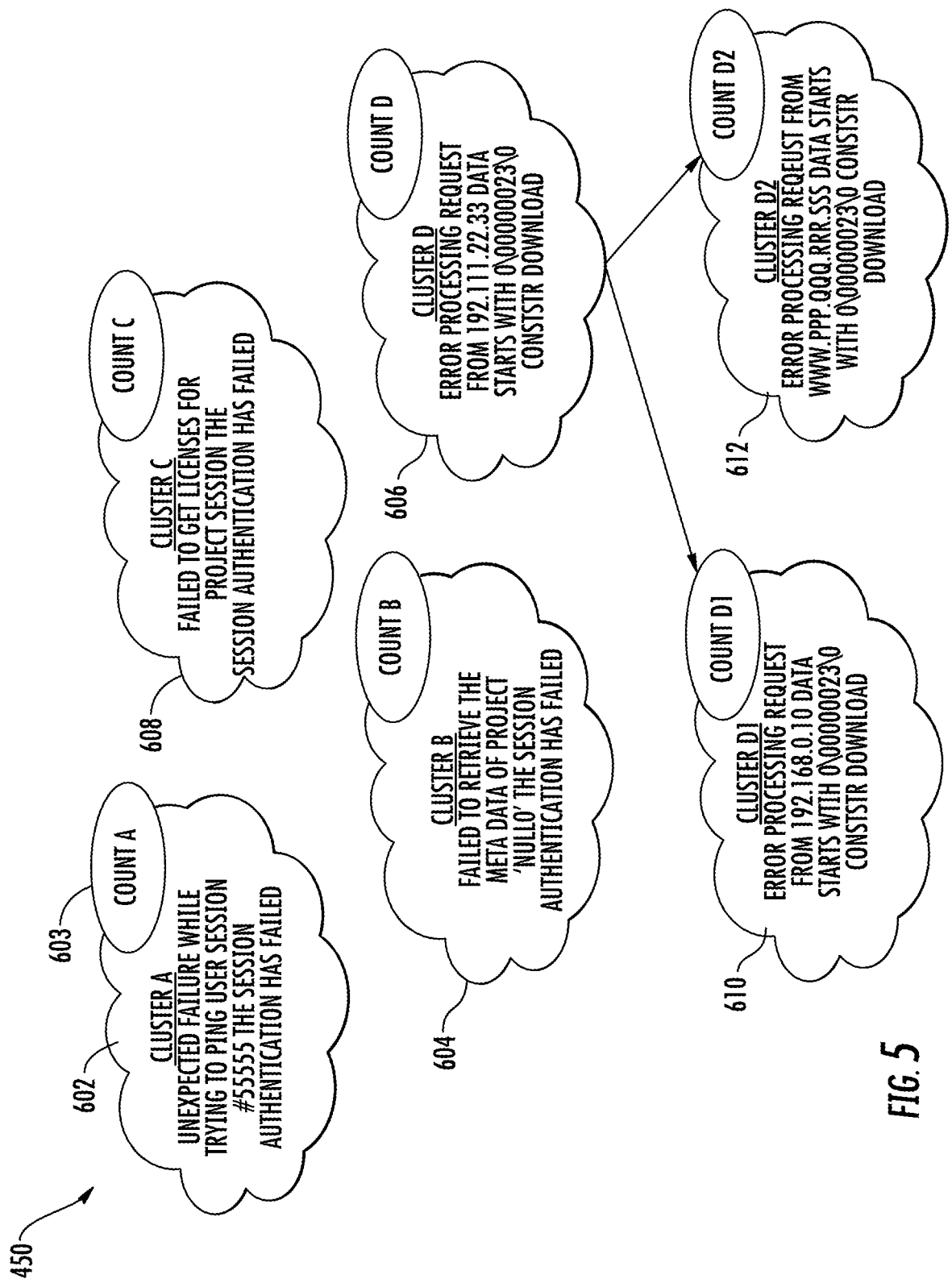
FIG. 5 is a schematic diagram of example clusters.

As shown in FIG. 2, as each new event message is received, the event message is either assigned to an existing message cluster block 42) or serves as a basis or message event template for defining or forming a new message cluster (block 44). FIG. 5 schematically illustrates an example set of clusters 602, 604, 606, 608, 610 and 612 formed from the example portion of the log file 100 shown in FIGS. 3 and 4. Clusters 610 and 612 are illustrated as being split from cluster 606.

Clusters 602, 604, 606, 608, 610 and 612 may be part of an overall cluster dictionary 450. In generating a cluster dictionary, such as the example cluster dictionary 450, system 20 begins with zero or more clusters defined in the cluster dictionary. Although schematically illustrated, cluster dictionary 450, may in practice, may be arranged as any appropriate form of data structure, for example a text file, table, database, xml file, etc. Each cluster 602 in the cluster dictionary 450 includes at least an event template, comprising the text 106 (or some other appropriate representation of the text, such as, for example, an encoded or hashed variant or a pointer to the text in a template database or the like) of a representative log event message, and a message count 603, indicating the number of times a log event message has been assigned to the cluster. In effect, each cluster represents a prototypical feature message according to a representative message. New event messages may be compared against the message event template text to determine whether the new event message is sufficiently similar to the cluster to be assigned to the cluster.

In one implementation, message clusters, such as clusters 602, 604, 606 comes 608, 610 and 612, are formed by clustering event messages that are sufficiently similar to one another based upon an order-sensitive cosine similarity function. One example of such an order-sensitive cosine similarity function that may be applied to provide a measure of similarity (i.e. a 'distance') of two messages may take the form:

$$<msg_1, msg_2> = \frac{n_{12}}{\sqrt{n_1 \cdot n_2}}, \qquad <\text{Equation 1}>$$

where $n_{12}$ is the number of identical words comparing each word position of $msg_1$ and $msg_2$, and $n_1$, $n_2$ are the numbers of words in each message. In the example, a resulting cosine distance is a number between 0 and 1. When the result is 1, the two messages are identical, and when the result is 0, the two messages are completely different. Values between 1 and 0 represent a measure or degree of similarity.

The determined similarity value may then be compared against a predefined threshold to determine whether a new event message should be assigned to an existing cluster. The pre-defined threshold may be determined heuristically by applying the process to a real data set—for which a higher threshold would lead to more clusters and a lower threshold would lead to fewer clusters—to establish what threshold provides the most accurate clustering. The threshold applied may vary between different systems, depending on the nature of the events that are generated.

FIG. 6 illustrates an example application of the order sensitive cosine similarity function (Equation 1) to the example 12 log event messages shown in FIG. 3. As shown by FIG. 6, text in the second event in the log file extract is very different from the text in the first event, even though each event comprises 14 words. As shown by the dotted arrows, the first nine words in each event are not the same; however the final five words in each event are the same, as represented by solid arrows. Applying Equation 1 to these two events provides the similarity measure of 5/14=0.357, which is below a predefined or selected threshold of 0.85 and means that the second event forms CLUSTER B 604, and the second event is assigned cluster B 440 in the cluster assignment 440. In contrast, the text in the fifth event in the log is the same as the text in the first event, apart from the 9th words in each, which are 55555 and 44444 respectively. Applying Equation 1 to the first and fifth events provides the similarity measure of $13/14=0.929$, which is above the threshold of 0.85. Hence the fifth event does not form a new cluster. Instead, it is assigned to cluster A in the cluster assignment 440 and the message count 603 for cluster A is incremented by one.

In other implementations, an edit distance, or variations of it, allowing for word insertions and deletions may be used to define a degree of similarity between two log event messages for purposes of clustering.

According to some examples, each new event is compared to the template in each of the existing clusters in the order in which the clusters were created, and is assigned to the first cluster to which the similarity threshold is exceeded. In some circumstances, an event may be assigned to the first cluster with which is exceeds the threshold, even though a later cluster might be a closer match. If the similarity threshold is not surpassed for any of the existing clusters, a new cluster is created and the event text is used as the event template of the new cluster.

As indicated by block 46, system 20 groups the clusters formed in blocks 42 and 44 into different families. Once the clusters have been initially grouped into families pursuant to block 48, analysis of subsequently received event messages 40 in blocks 42 and 44 is carried out in a predefined family-by-family order that may facilitate faster matching or assignment of the incoming event message to an event message cluster. In one implementation, within each family, the clusters are compared to the incoming event message based on the relative age of each cluster in the family, in an order from oldest to youngest.

Block 46 illustrates the triggering of the grouping of clusters into families. In one implementation, the grouping of clusters into families is automatically triggered in response to the creation of a new message cluster, per block 44. In such an implementation, the newly created cluster may be compared to the existing clusters to determine whether the newly created cluster should join an existing family of clusters or should serve as a foundation for a new family of clusters. In another implementation, the grouping of clusters into families is automatically triggered in response to a predefined threshold being satisfied or not being satisfied, such as the total number of individual clusters, not part of any multi-cluster family, exceeding a threshold or in response to performance of system 20 failing to satisfy a predefined performance threshold. In another implementation, the grouping of clusters into families is automatically triggered on a periodic basis. For example, such grouping of clusters may occur "off-line" at predefined time intervals. In yet another implementation, the grouping of clusters may be triggered in response to a user inputted command to initiate grouping.

Figure 8:
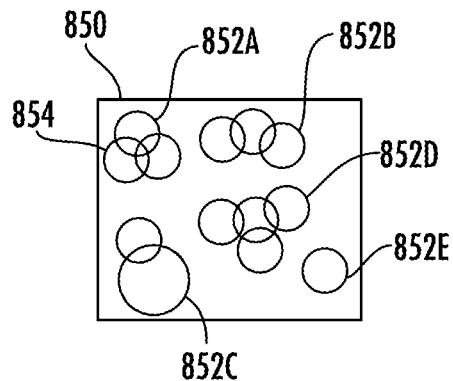
FIG. 8 is an example diagram schematically illustrating a cluster dictionary comprising cluster families of message clusters.

As indicated by block 48, once such cluster grouping has been triggered, manager 26 proceeds with the grouping of clusters into families. During such grouping, manager 26 compares the relationship between existing clusters in cluster dictionary 24 to determine whether clusters are sufficiently similar so as to overlap one another. FIG. 8 is a diagram schematically illustrating an example cluster dictionary 850 illustrating various cluster families 852A, 852B, 852C, 852D and 852E (collectively referred to as cluster families 852) formed within memory 26 by manager 26. As shown by FIG. 8, the different cluster families 852 are each composed of different log event message clusters 854. The log event clusters 854 of each of cluster families 852 are sufficiently proximate or near one another so as to be grouped in a single cluster family. As shown by FIG. 8, cluster families 852 may have various forms. Cluster 852A illustrates an example cluster family in which three clusters each concurrently overlap one another, each cluster overlapping both of the other two clusters. Cluster family 852B illustrates a cluster family in which two outer clusters overlap a central cluster, forming a chain. Cluster family 852C illustrates a cluster family formed from two overlapping clusters, wherein the two clusters have different cosine distances with respect to their centers or representative messages. Cluster family 852E comprises a single cluster to which additional clusters may be subsequently appended.

In one implementation, the determination of whether to group two clusters is in a fashion similar to the determination of the nearness between two log event messages when determining whether the two event messages should be clustered together. In one implementation, the representation message serves as a center of each cluster while the outer bounds of the cluster is defined by the threshold order sensitive cosine distance (described above) from the representation message. The order sensitive cosine distance of the representative message serves as a radius. Two clusters are grouped together as part of a single cluster family when the outer bounds of a first cluster intersects or overlaps the outer bounds of a second cluster.

For example, in one implementation, for each event message cluster being examined, cluster manager 26 may determine whether the representative event message of the cluster being examined falls within an order sensitive cosine threshold of any other cluster of cluster dictionary 24. In response to the cluster being examined having a representative message falling within the order sensitive cosine threshold of another cluster (whether the other cluster is an individual cluster or a cluster family), the cluster is merged with the other cluster to form a multi-cluster family. In other implementations, other criteria may be applied to determine the relationship or proximity of a cluster and another cluster or multi-cluster family and to determine whether the cluster should be merged with the other cluster or multi-cluster family.

Figure 9:
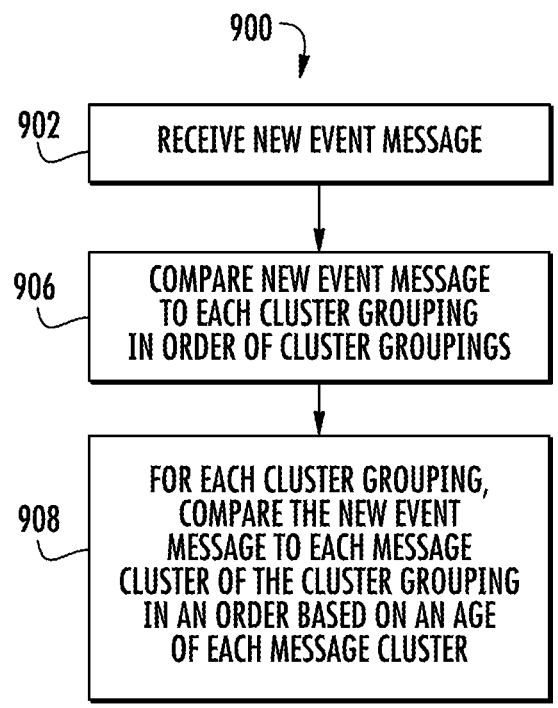
FIG. 9 is a flow diagram of an example method for managing analytics of log event clusters using cluster families.

FIG. 9 is a flow diagram schematically illustrating one example method 900 of how manager 26 utilizes cluster dictionary 850, comprising families of clusters, to facilitate quicker matches such that those clusters more likely to match (i.e., fall within the order sensitive cosine threshold of the representative message of a cluster) the new event message are processed before other less relevant clusters. As indicated by block 902, manager 26 receives the new log event message (similar block 40).

As indicated by block 906, manager 26 may compare the new event message to each cluster 852 in cluster dictionary 850 according to a predefined order of cluster families. The predefined order of the cluster families 852 may not necessarily be based upon age of the cluster family and may not static. For example, in one implementation, the order in which manager 26 compares cluster families 852 to the new event message is based upon a historical frequency of event messages being added to a member cluster of the particular cluster family. In one implementation, those cluster families that are the most active with respect to the addition of event messages, are examined first, prior to other cluster families that may be less active with respect to the addition of event messages. For example, in one particular circumstance where cluster family 852B was being assigned event messages covers predetermined period at a higher rate as compared to the rats at which event messages, during the same predetermined period of time, were assigned to cluster family 852C, manager 26 may compare a new event message to the clusters of cluster family 852B prior to comparison to the clusters of cluster family 852C. In this fashion, those clusters that are more relevant, that may be more likely to be a match with the new event message (where the new event message is more likely to fall within the threshold cosine distance or the outer bounds of a particular cluster) are examined before other less relevant clusters.

In one implementation, the predetermined order at which the cluster families 852 are examined with respect to a new event message is based upon activity or frequency of event message additions over multiple periods of time, wherein the different periods of time may be differently weighted. For example, the rate at which prior event messages have been added to a particular cluster family for a more recent period of time may be given a greater weight or weighting as compared to the rate at which prior event messages have been added to the particular cluster family during an older period of time.

In one implementation, different weightings may be applied to the historical activity values for the different cluster families 852 for different periods of time based upon the period of time or current universal time from which the new event message has arisen. For example, in circumstances where the new event message was generated or stored in the log at a particular time of the day, day of the week, day of the month or the like, those activity rates for each of the different cluster families for the same particular lime the day, day of the week, day of the month or the like may be given a higher weighting as compared to other different times of day, days of the week, days of the month or the like. In one implementation, the closer a particular time period is to the period of time during which the new event message originated, the greater the weighting may be applied to the activity value for the particular period of time for each of the cluster families 852. In other words, the activity (the rate at which event matches are being added a member cluster of a cluster family) for a particular period of time will have a larger impact on the order in which the different cluster families are examined with respect to a new event message depending upon how similar the particular period of time is to the particular period of time during which the new event message was received or logged. If a new event message is received on Wednesday afternoon, the historical activity values for the different cluster families 852 for historical periods of time encompassing Wednesday afternoons will be given a greater weighting as compared to the activity values for other periods of time, say Friday mornings, for the different cluster families 852.

In one implementation, the order in which cluster families 852 are compared to the new event message is not based upon activity (the rate at which event messages have been previously added to a member cluster of the cluster group), but is based upon timing similarities. Those cluster families 852 having clusters having a larger percentage of assigned event messages that were logged or received closer in time or during the same period of time as the new event message being examined will be examined prior to those cluster families having clusters having a smaller percentage of assigned event messages that were logged or received farther away in time or more remote with respect to the period of time during which the new event message being examined was received or logged. For example, if a new event messages received or logged at 2 PM, manager 26 may first examine those cluster families 852 having a large percentage of event messages assigned to them that were also received or logged at 2 PM as compared to other cluster families having a smaller percentage of event messages assigned to them that were also received or logged at 2 PM. By identifying those particular cluster families that are more likely to contain a cluster that matches the new event message, either based upon historical activity or based upon seasonality or timing, the time to match or assign the new event message to an appropriate cluster may be reduced, shortening the automated processing time for the new event message.

As indicated by block 908, for each cluster family 852 that is being examined with respect to the new event message received by manager 26, manager 26 automatically compares the new event message to each message cluster of the cluster family 852 in an order based upon an age of each message cluster. For example, when examining cluster family 852B, manager 26 compares the ages (when each of the clusters were created) of each of the member event clusters 854, and proceeds through the member clusters of the cluster family in an order based upon the comparison. In one implementation, manager 26 compares a new event message to each of the clusters of the cluster family, in an order from oldest to youngest. By examining each cluster within a particular cluster family based upon the age of the individual clusters, uniformity or local determination is achieved in that a new event message that fails within the scope of multiple clusters within the same cluster group will be assigned to the same cluster each time, the oldest cluster.

Upon identifying a matching cluster and assigning the new event message to the matching cluster, manager 26 proceeds to the next received event message and repeats the above described method 900. In the event that the new event message does not match any of the existing clusters of any of the existing cluster families, manager 26 creates a new cluster and a new corresponding cluster family (the new cluster family initially comprising a single cluster), wherein the new event message serves as the initial representative message for the cluster and corresponding cluster family.

FIG. 10 schematically illustrates another example automated log event log event cluster analytics management system 1120, an example of system 20. System 1120 facilitates the analysis of log event messages received from across large-scale systems and networks by storing a portion (less than the entirety) of the total cluster dictionary in a transient memory of a computer node for initial faster analysis while maintaining a larger persistent storage database of the entire cluster dictionary, wherein a text search engine is used to identify those clusters in the persistent storage database for analysis should an incoming event message not match any of the clusters in the transient memory. As a result, the generally smaller transient memory may facilitate faster matching of an incoming log event message to a cluster.

In the illustrated example, the entire cluster dictionary 24 of clusters 1150 is stored in a nonvolatile persistent storage device or database 1154. In one implementation, database 1154 comprises a disk-based storage system. In other implementations, database 1154 may comprise other forms of non-volatile persistent storage devices. In one implementation, database 1154 comprises a single persistent storage unit. In other implementations, database 1154 may be distributed across multiple individual persistent storage units. Although possibly slower to access information as compared to a transient memory, such as random access memory, database 1154 offers a storage platform having a much larger capacity that may be more suited for storing the large number of clusters that may result from a large-scale system or network. In some implementations, database 1154 may have a maximum size on the order of terabytes or larger.

As further shown by FIG. 10, system 1120 allocates or apportions a subset 1160 of the total number of clusters 1150 stored in database 1154 to a main memory or transient memory 1156. Transient memory 1156 comprises a volatile memory, such as a random access memory. In contrast to the persistent storage device of database 1154, the transient memory 1156 may offer faster searching and faster retrieval of data, facilitating faster matching of an incoming log event message to an event cluster, if the event cluster is contained in transient memory 1156. Transient memory 1156 may have a much smaller capacity as compared to database 1154. In one implementation, transient memory 1156 may have a maximum size on the order of gigabytes.

In one implementation, manager 26 selects the portion or subset 1160 of the total number of clusters 1150 of dictionary 24 that is contained within transient memory 1156 based upon the age of the individual message clusters 1150. For example, in one implementation, manager 26 automatically maintains those message clusters of dictionary 24 in transient memory 1156 that have an age less than a predetermined threshold age. In another implementation, manager 26 automatically maintains a predetermined percentage of the youngest message clusters of dictionary 24 within transient memory 1158. In yet another implementation, manager 26 automatically maintains a predetermined number of the most recently created message clusters within memory 1156, wherein older clusters are expelled on a first in first out basis. In yet other implementations, manager 26 automatically maintains in memory 1156 those message clusters having an activity level (based upon the number of event messages assigned to the particular message cluster during a predetermined period of time) that is greater than a predetermined threshold. In yet other implementations, manager ranks or orders the message clusters within dictionary 24 and automatically maintains a predetermined number or percentage of the message clusters in memory 1156, based upon the relative activity ranking. In such a manner, those clusters most likely to satisfactorily match the new event message and be assigned the new event message are maintained in transient memory 1156 while those less relevant clusters, the clusters that are older, or that have lower activity levels or the like, are maintained as part of the overall cluster dictionary 24 maintained in persistent database 1154.

FIG. 11 is a flow diagram illustrating an example method 1200 for managing the analytics of clusters by manager 26 in system 1120. As indicated by block 1202, a first portion of the entire overall cluster dictionary is stored in transient memory 1156. As indicated by block 1204, at least a second portion of the entire overall cluster dictionary is stored in persistent database 1154.

As indicated by block 1206, manager 26 initially carries out a level I analysis by comparing the new log event message to each of the clusters in the transient memory 1156. In one implementation, manager 26 compares the new event message to the clusters 1160 in transient memory 56 in order based upon the age of each of clusters 1160, from oldest to youngest. Should a match be found, should the new event message be satisfactorily near one of clusters 1160 (the new event message falling within the order sensitive cosine distance of the particular cluster 1160), manager 26 assigns the new event message to the particular cluster 1150 and proceeds with analysis of the next succeeding new event message.

As indicated by block 1208, in response to the new event message not satisfactorily matching any of the clusters 1150 within transient memory 1156, manager 26 automatically carries out a level II analysis by selecting a subset 1166 of the clusters contained in persistent database 1154 for examination with respect to the new event message. In one implementation the subset 1166 is selected by manager 26 using term vector analysis. In one implementation, the persistent database 1154 is built on a Lucene index or similar indexing foundation, wherein Lucene and its term vector analysis is used to efficiently recall or extract subset 1166 from persistent database 1154 based upon a proximity of each of the clusters of subset 1166 to the new event message.

As indicated by block 1212, manager 26 compares the new event message to each of the clusters of the subset 1166 from the persistent database 1154 in the same fashion as was performed with the comparison of the new event message to each of the clusters in the transient memory 1156. In one implementation, the new event message is compared to each of the clusters in subset 1166 until a sufficient match is found, wherein the manager 26 compares the new event message to the subset 1166 of clusters 1150 in order based upon the age of each of clusters 1150 of subset 1166, from oldest to youngest. Should a match be found, should the new event message be satisfactorily near one of clusters 1150 of subset 1166 (the new event message falling within the order sensitive cosine distance of the particular cluster 1162), manager 26 assigns the new event message to the particular cluster 1150 and proceeds with analysis of the next succeeding new event message. Should a match not be found, log event cluster analytics manager 26 creates a new cluster based upon the new event message, the new cluster being added to the overall cluster dictionary 24, and in some implementations, to the subset of clusters stored in transient memory 1156.

In the above described implementation of system 1120, persistent database 1154 stores the entire cluster dictionary 24, wherein a portion or subset of the entire dictionary 24 is duplicated and maintained in the transient memory 1156. In an alternative implementation, persistent database 1154 may not store the entire cluster dictionary 24, but the entire cluster dictionary 24 may be distributed between persistent database 1154 and transient memory 1156. For example, in one implementation, more frequently matched clusters 1150 may be stored in transient memory 1156 while the less frequently matched or less active clusters 1150 may be stored in persistent database 1154. In such an implementation, transient memory 1156 may not contain the entire cluster dictionary 24. At the same time, persistent database 1154 also may not contain the entire cluster dictionary 24. Moreover, the entire cluster dictionary 24 may not be indexed and searched pursuant to block 1208 and 1212 of method 1200.

In some implementations, manager 26 automatically maintains those clusters 1150 in persistent database 1154 (and not in transient memory 1156) that have attained an age greater than a predetermined threshold age. In another implementation, manager 26 automatically maintains a predetermined percentage of the oldest message clusters within persistent database 1154. In yet another implementation, manager 26 automatically maintains a predetermined number of message clusters within transient memory 1156, wherein older clusters are expelled or transferred from transient memory 1156 to distributed database 1154 on a first in first out basis. In yet other implementations, manager 26 automatically maintains in distribute database 1154 (and not in transient memory 1156) those message clusters having an activity level (based upon the number of event message is assigned to the particular message cluster during a predetermined period of time) that falls below a predetermined threshold. In yet other implementations, manager ranks or orders the message clusters within transient memory 1156 and automatically transfers a predetermined number or percentage of the message clusters to persistent database 1154, based upon the relative activity ranking. In such a manner, those clusters most likely to satisfactorily match the new event message and be assigned the new cup event message are maintained in transient memory 1156 while those less relevant clusters, the clusters that are older, have lower activity levels or the like, are maintained in persistent database 1154.

FIG. 12 schematically illustrates another example automated log event log event cluster analytics management system 1320, an example of system 20. System 1320 facilitates the analysis of log event messages received from across large-scale systems and networks by distributing the analysis of incoming event messages amongst multiple computer nodes, each of the computer nodes having an associated transient memory storing a portion or subset of the overall cluster dictionary, wherein the overall cluster dictionary is stored in the larger persistent storage database. Each computer node operates in a fashion similar to system 1120 and method 1200 described above.

In the example illustrated in FIG. 12, manager 26 apportions the comparison of newly received event messages with respect to the cluster dictionary 24 amongst different computer nodes 1302, 1304, 1306, each compute node comprising a processor and instructions for directing operation of processor, wherein the instructions are stored on a non-transitory computer-readable medium. As shown by FIG. 12, computer nodes 1302, 1304 1306 compare their received log event messages to corresponding assigned subsets 1312, 1314 and 1316 of clusters 1318 stored in transient memories 1322, 1324 and 1326, respectively.

In the example illustrated, computer node 1302 compares its assigned log event messages against clusters 1-100 stored in its associated transient memory 1322; computer node 1304 compares its assigned log event messages against clusters 50-150 stored in its associated transient memory 1324; and computer node 1306 compares its assigned log event messages against clusters 100-200 stored in its associated transient memory 1326. Log event cluster analytics manager 26 maintains the entire dictionary in persistent database 1154, clusters 1-200 in the illustrated example. Although FIG. 12 illustrates three compute nodes, in other implementations, greater or fewer number of such compute nodes may be used to collectively process received event messages.

Although FIG. 12 illustrates the cluster dictionary 24 being allocated in an overlapping fashion amongst the memories 1322, 1324, 1326, of the different computer nodes, in other implementations, the cluster dictionary 1315 may be allocated in other overlapping fashions or non-overlapping fashions amongst the different memories, such as random access memories, of the different computer nodes 1302, 1304, 1306. For example, in other implementations, computer node 1302 may compare new event messages to clusters 1-66, computer node 1304 may compare new event messages to clusters 67-133 and computer node 1306 may compare new event clusters to clusters 134-200. By allocating the analysis or matching of new event messages amongst multiple computer nodes, processing time and backlogs for handling large numbers of event messages are reduced, and message processing throughput can be scaled higher within the framework of the system.

FIG. 13 is a flow diagram illustrating an example method 1400 for managing clusters by manager 26 in system 1320. As indicated by block 1402, manager 26 divides or allocates new event messages that are received amongst the different computer nodes, such as computer nodes 1302, 1304, 1306, for comparison to the different associated subsets of clusters of the overall set of clusters forming the cluster dictionary 1350. As discussed above with respect to blocks 42 and 44 in FIG. 2, each computer node 1302, 1304, 1306 compares its assigned log event messages to its associated subset of clusters. If a sufficient match has been found, the particular event message is assigned to a particular cluster in the subset of clusters associated with a particular computer node. If the new event message being processed by particular computer node does not satisfactorily match any of the clusters in the subset of clusters in the particular transient memory for the particular computer node (i.e., the new event message does not fall within the order sensitive threshold cosine distance of the representative event message for any of the clusters in the transient memory assigned to the particular computer node), the computer node proceeds by selecting a subset of the clusters stored in distributed database 1154 for examination as described above with respect to block 208. The individual compute node 1302, 1304, 1306 compares the new log event message to the clusters of the selected subset and assigns the new log event message to one of the clusters if a match is identified. If no match is identified, the compute node 1302, 1304, 1306 creates a new message cluster containing the new event message in its associated transient memory 1322, 1324, 1326 and in persistent database 1154.

Due to the divided or distributed analysis of event messages by manager 26, different computer nodes 1302, 1304, 1306 may, at times, create message clusters in their respective memories and in persistent database 1154 that are substantially similar or identical to one another. As indicated by block 1404 In FIG. 13, log event cluster analytics manager 26 periodically or in an off-line fashion, compares the clusters in the persistent database 1154 to one another to determine if a sufficient amount of similarity between any of the clusters exists to trigger merging of different newly created clusters. In one implementation, log event cluster analytics manager 26 determines whether the center (the representative message) of a particular cluster lies within the outer bounds of another cluster (within the order sensitive cosine distance threshold from the representative message of the other cluster) to determine whether the two clusters should be merged to achieve a stable eventually consistent model of log clusters or cluster dictionary. In one implementation, for each of the clusters within persistent database 1154, manager 26 determines whether the representative message of a first cluster being examined falls within a predetermined order sensitive cosine threshold with respect to a second cluster to determine whether the first cluster and the second cluster should be merged into a single cluster. In one implementation, the predetermined order sensitive cosine threshold used to determine whether two clusters should be merged into a single cluster is less than the predetermined order sensitive cosine threshold described above with respect to method 900 that is used to determine whether two clusters should be grouped as part of a multi-cluster family.

As indicated by block 1406 in FIG. 13, if two clusters are found to be the same log cluster or substantially similar to one another (satisfying a predetermined similarity threshold) so as to support merging, log event cluster analytics manager 26 merges the two clusters and persists the single cluster resulting from the merger to persistent database 1154. The single cluster formed from the merging of the two previous clusters in database 1154 may then be apportioned to the appropriate transient memories 1322, 1324, 1326 for use by the different computer nodes 1302, 1304, 1306.

Although each of methods 1200 and 1400 are described in terms of individual clusters 1150, in other implementations, methods 1200 and 1400 may be carried out with respect to families comprising an individual cluster and multi-cluster families as described above with respect to FIGS. 2, 8 and 9. In such an implementation, clusters 1150 are grouped into families and wherein an incoming message is analyzed with respect to the formed cluster families in a manner described above with respect to method 900.

Figure 14:
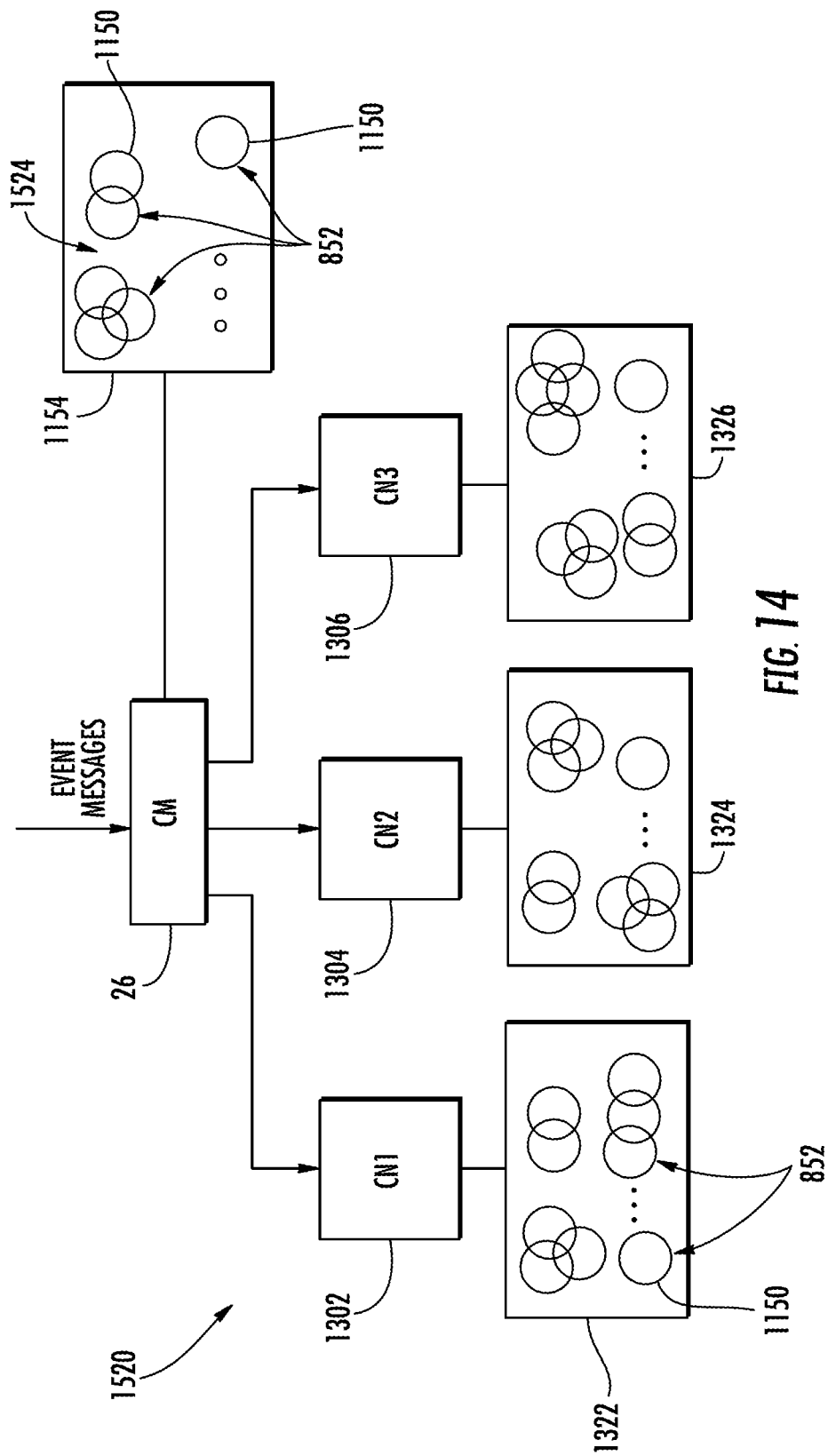
FIG. 14 is a schematic diagram illustrating an example log event cluster analytics management system.

FIG. 14 is a diagram schematically illustrating another example automated log event log event cluster analytics management system 1520, an example of system 20. System 1520 facilitates the analysis of log event messages received from across large-scale systems and networks by carrying out each of methods 900, 1200 and 1400 described above. In the example illustrated, the individual clusters in each of memories 1322,1324, 1326 are grouped into cluster families in a fashion similar to the cluster families as described above with respect to FIGS. 2 and 8-9. In one implementation, all of the clusters of the overall cluster dictionary 24 are grouped into cluster families, wherein the formed cluster families are allocated or apportioned amongst the different transient memories 1322, 1324, 1326 of the different computer nodes 1302, 1304,1306 in an overlapping fashion (similar to the overlapping of the clusters as described above with respect to FIG. 12) or in a non-overlapping fashion where memories 1322, 1324, 1326 do not contain any identical cluster family. In another implementation, all of the clusters of the overall cluster dictionary 1350 are first allocated or apportioned amongst the transient memories 1322, 1324, 1326 of the different computer nodes 1302, 1304, 1306, respectively, wherein the individual clusters assigned to the different memories 1322, 1324, 1326 are then examined and grouped into cluster families within each memory. The clusters of the overall cluster dictionary 1524 contained in persistent database 1154 are provided with the same cluster families as those contained in memories 1322, 1324, 1326.

Figure 15A:
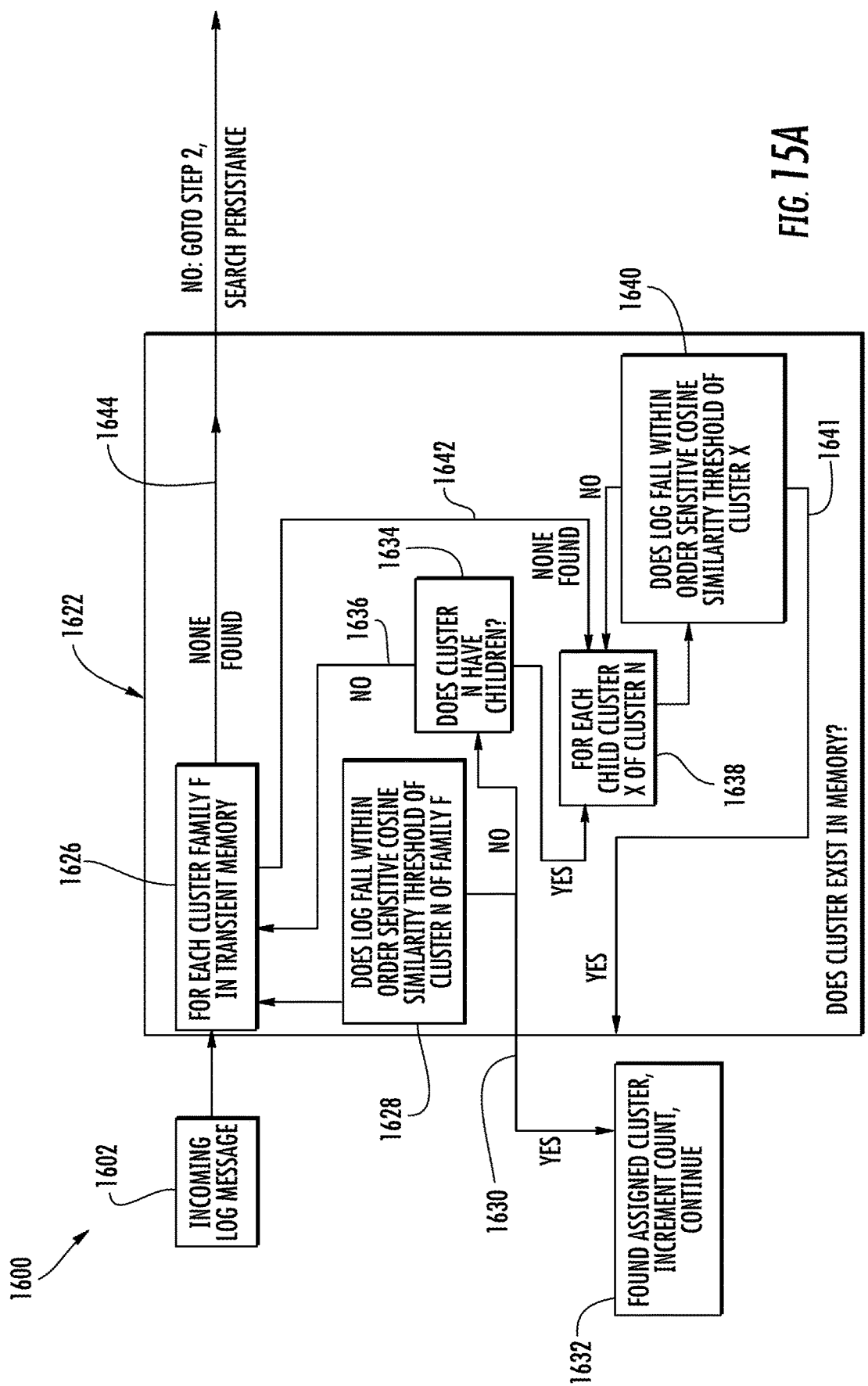
FIG. 15A is a flow diagram of a first portion of an example method for managing analytics of log event clusters.
Figure 15B:
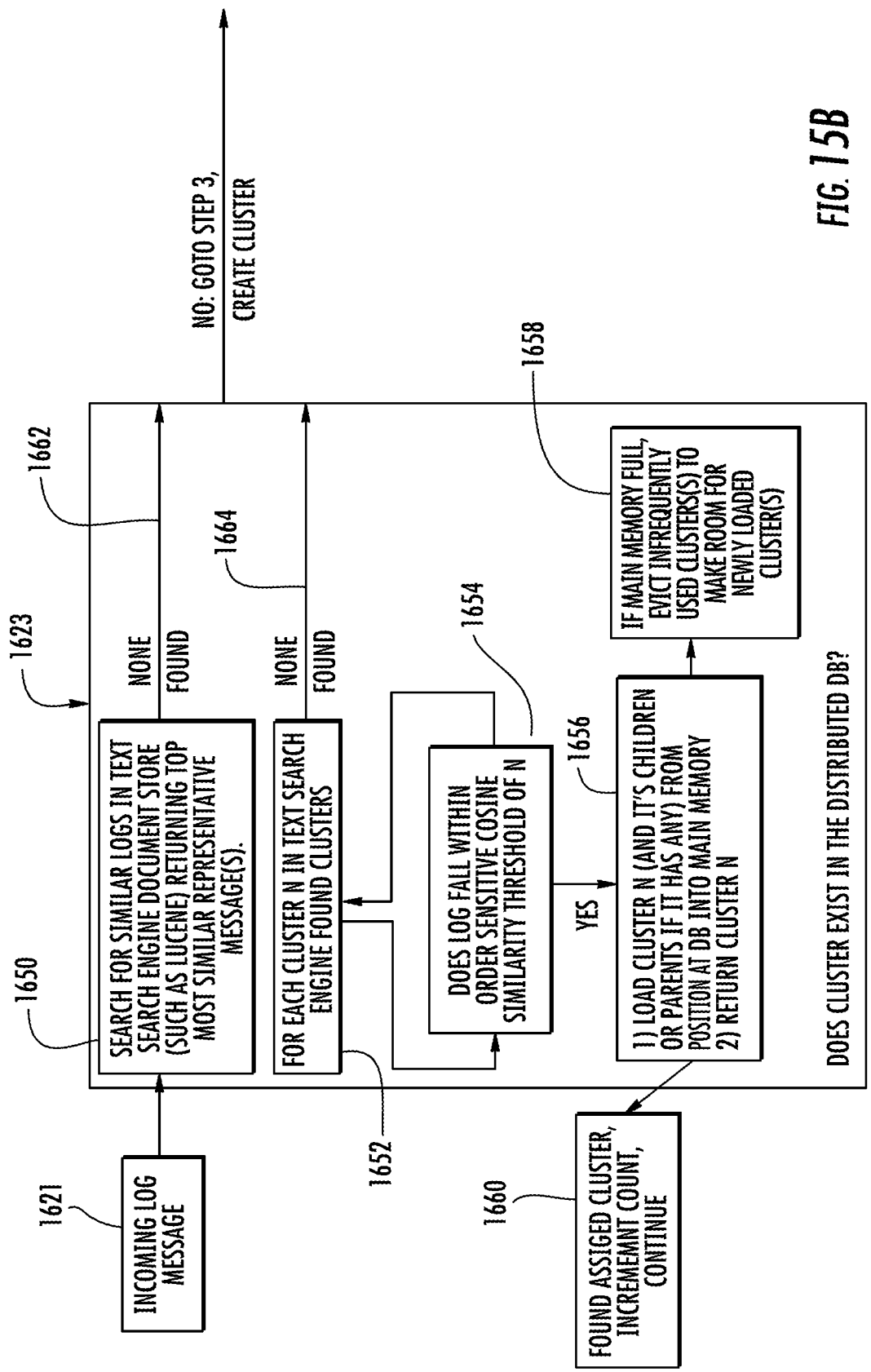
FIG. 15B is a flow diagram of a second portion of the example method for managing analytics of log event clusters.
Figure 15C:
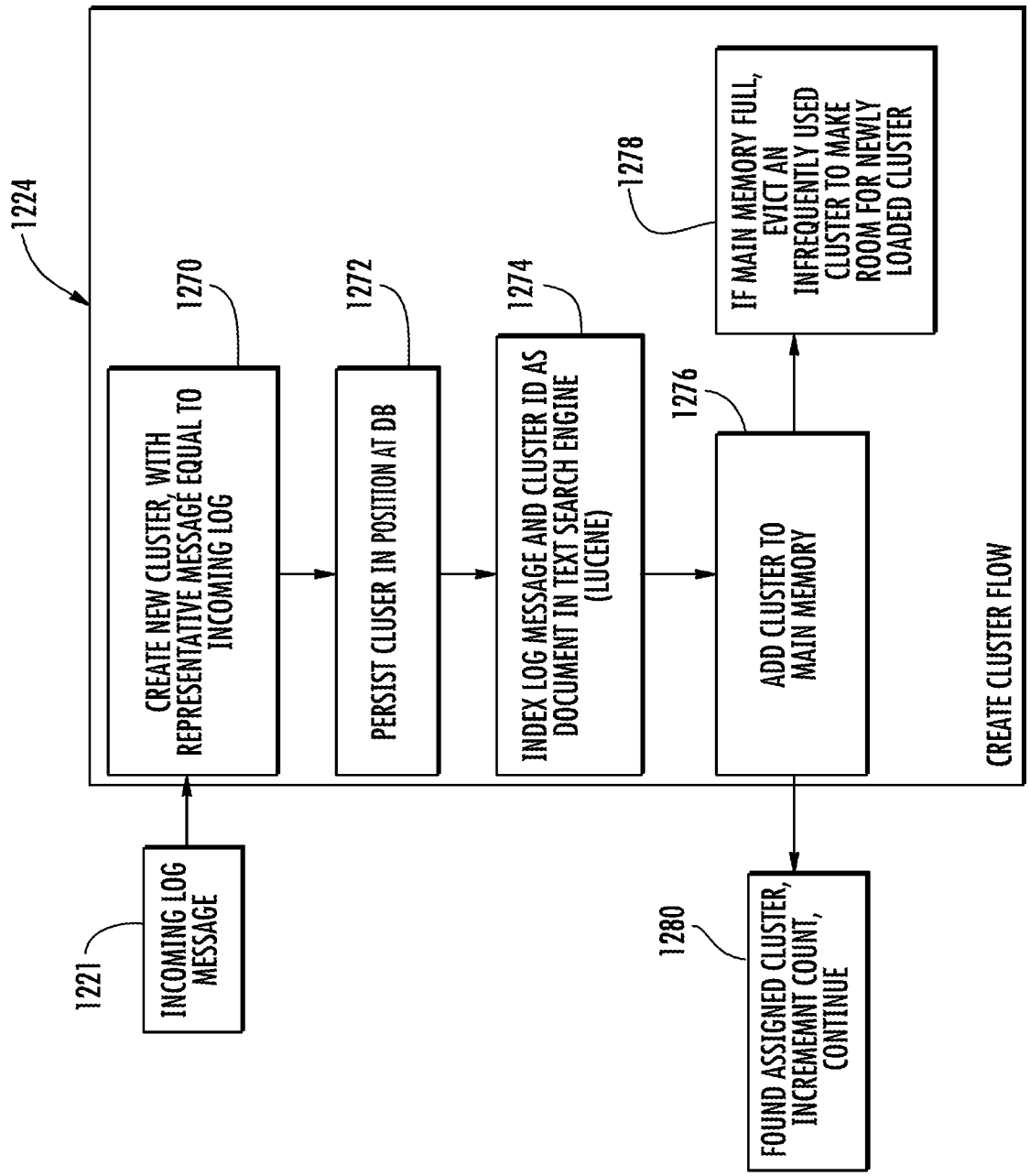
FIG. 15C is a flow diagram of a third portion of the example method for managing analytics of log event clusters.
Figure 16:
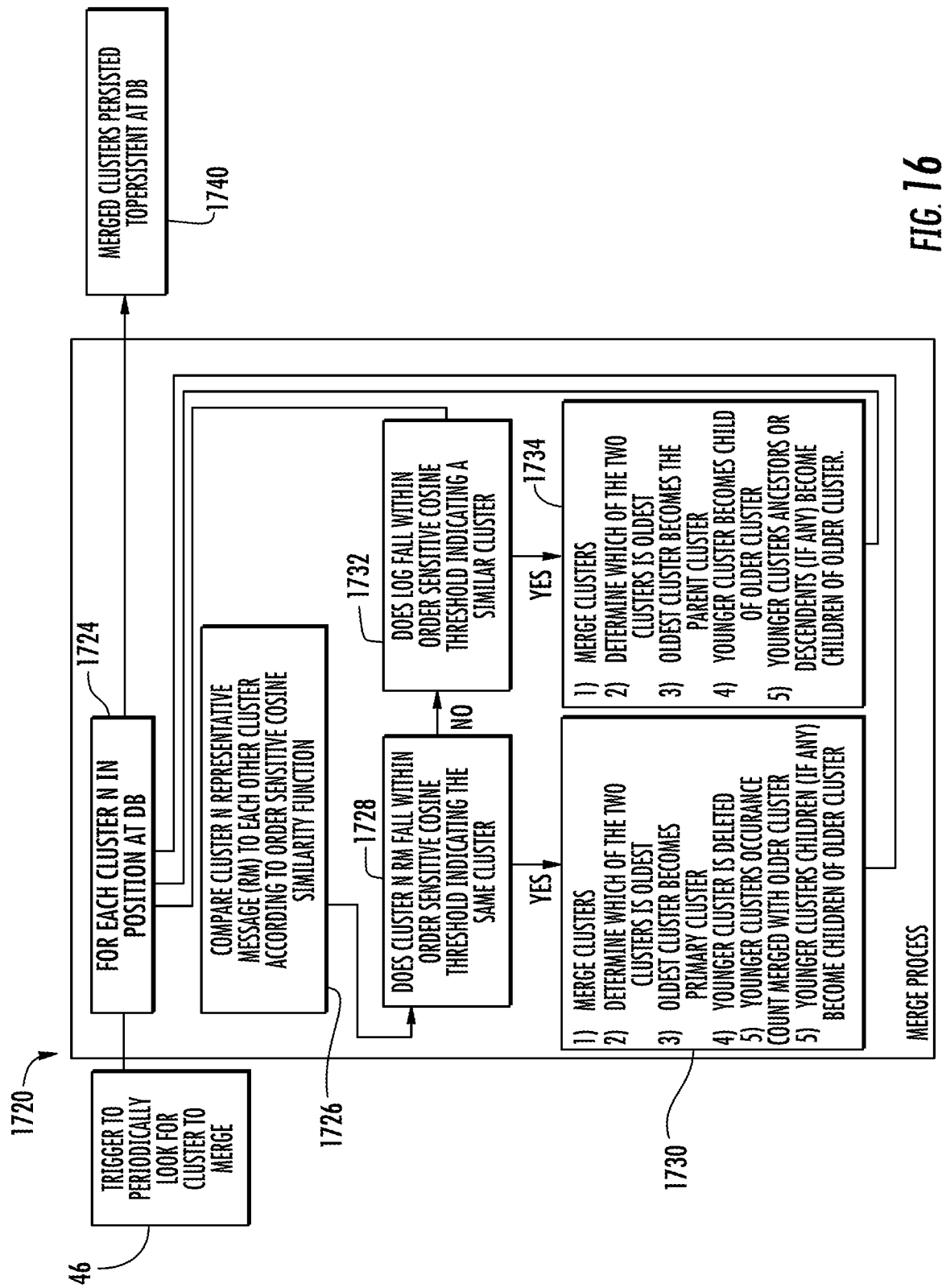
FIG. 16 is a flow diagram of an example method for merging clusters.

FIGS. 15A-15C are flow diagrams of an example method 1600 that involves three general operations; determining whether an incoming log message 1602 falls within an existing cluster in main or transient memory 1152 (operation 1622 illustrated in FIG. 15A), if not, determining whether the incoming log message 1602 falls within an existing cluster in a distributed may database 1154 (operation 1623 illustrated in FIG. 15B), and, if not, creating a new cluster based upon the incoming log message 1602 (operation 1624 illustrated in FIG. 15C). In the example illustrated, the operation 1623 is concurrently carried out by each compute node 1322, 1324, 1326 as each compute node 1322, 1324, 1326 receives its allocated incoming log message 1602 for analysis. In one implementation, as illustrated by FIG. 14, the clusters 1150 in both the individual transient memories 1322, 1324 and 1326 as well as persistent database 1154 have been previously grouped into families 852. Each family 852 comprises a parent cluster N that is the oldest cluster of the family and may additionally comprise younger clusters X which are children of the parent cluster N. Some of families 852 may have a parent cluster N without any child clusters X.

For purposes of discussion, operation 1622 is described as being carried out with respect to an incoming log message 1602 received by compute node 1302 with associated transient memory 1322. Each of the steps described with respect to compute node 1302 as part of operation 1622 or as part of other operations of method 1600 may likewise be similarly carried out by each of the other compute nodes, compute nodes 1304 and 1306. As compute node 1302 ask upon Its transient memory 1322, compute nodes 1304 and 1308 act upon their respective transient memories 1324 and 1326, respectively. As indicated by blocks 1626 and 1628, for each cluster family 852 contained in the particular transient memory 1322, compute node 1302 determines whether the particular incoming log message 1602 falls within an order sensitive cosine similarity threshold of a particular cluster of the family. The analysis to determine whether the incoming log event message 1602 falls within the order sensitive cosine similarity threshold is pursuant to the order described above respect to method 900. As described above with respect to block 906 and method 900, the families are analyzed in a predefined order of cluster families to facilitate faster matching of the incoming log message 602 to a cluster.

As indicated by block 1628, for each family 852 being examined, the incoming log event message 1602 is first compared to the parent cluster N of the cluster family 852. As indicated by arrow 1630, if the incoming log message 1602 does fall within the cosine similarity threshold for a particular parent cluster N, node 1302 proceeds by assigning the incoming log message to the particular parent cluster N and by continuing with the next incoming log message. As indicated by block 1634, if the incoming log message 1602 does not match the parent cluster N of the particular family being examined by compute node 1302, the computer node 1302 determines whether the or parent cluster N has any children clusters X. As Indicated by arrow 1636, if the particular cluster N does not have any children (i.e., the cluster family 852 contained a single cluster), compute node 1302 returns to block 1226 and examines the next cluster family 852 in transient memory 1322. As indicated by blocks 1638 and 1840, if the parent cluster N has children clusters X, for each child cluster X of cluster N, compute node 1302 determines whether the incoming log message 1602 falls within the order sensitive cosine similarity threshold of cluster X. The compute node 1322 compares the incoming log event message 1602 to each of the children clusters X of the same family 852 in an order based upon the age of each child cluster X, oldest to youngest, until a match is found or until all of the children clusters X of the particular parent cluster N in the particular family 852 have been examined. As indicated by arrow 1641, if the incoming log message 1602 does fall within the cosine similarity threshold for a particular child cluster X, manager 1232 assigns the incoming log message to the particular cluster X and by continues with the next incoming log message.

As indicated by arrow 1642, if the incoming log message 1602 does not fall within the cosine similarity threshold of any of the child clusters X of the particular cluster N in the particular family 852, manager 26 returns to block 1626 to examine the next cluster family 852, beginning with the parent cluster N of the particular family 852. As indicated by arrow 1644, if the incoming log message does not fall within the order sensitive cosine similarity threshold of any cluster N or any child clusters X of any cluster families 852 residing in the particular transient memory 1322 contained in transient memory 1322, method 1600 proceeds to operation 1623.

In operation 1623, manager 26 and/or compute node 1302 determines whether the incoming log message 1602 falls within any of the parent clusters N of the families 852 of the overall cluster dictionary 1524 as stored in persistent database 1154. As indicated by block 1650, manager 26 and/or compute node 1302 searches for similar log messages or logs using a text search engine 1154, returning the top most similar representative message or messages along with their associated clusters 1150 and associated cluster families 852. In one implementation, the text search engine comprises Lucene, a high performance text searching library. In such an implementation, the Lucene index is built over the representative messages of each cluster as it is created, and linked to cluster dictionary 1524 in persistent database 1154 in other implementations, other text search engines may be utilized to identify the most similar representative log messages and their associated clusters contained in secondary memory 1154.

As indicated by blocks 1652 and 1654, for each cluster N in the text search engine found clusters 1150, manager 26 and/or compute node 1302 determines whether the incoming log message 1602 falls within the order sensitive cosine similarity threshold of the particular cluster N. As indicated by block 1656, if the incoming log message 1602 falls within the cosine similarity threshold of the particular cluster N (cluster 1150 of subset 1166) found in persistent database 1154, manager 26 and/or compute node 1302 loads particular matching cluster N (cluster 1150 of subset 1166) and its children or parents, if any, from the persistent database 1154 into the transient memory 1322 associated with compute node 1302. As indicated by block 1658, if the transient memory 1322 is full, manager 26 and/or compute node 1302 first evicts at least one infrequently used cluster 1150 from transient memory 1322 to make room for the cluster (cluster 1150 of subset 1166) (along with its children X). As indicated by block 1660, the incoming log message 1602 is assigned to the particular cluster N (cluster 1150 of subset 1166) and compute node 1302 proceeds with operation 1222 for the next incoming log message 1602.

As indicated by arrow 1662, if the search carried out in block 1650 does not identify any similar logs and corresponding clusters, manager 26 and/or compute node 1302 proceeds with operation 1224 with respect to the incoming log message 1602 likewise, as indicated by arrow 1664, if the incoming log message 1602 does not fall within the order sensitive cosine similarity threshold for any of the clusters N identified by the text search engine (clusters 1162 of subset 1166), manager 26 and/or computer node 1302 proceeds with operation 1624 with respect to the incoming log message 1602.

In operation 1224, manager 26 and/or compute node 1302 creates a new cluster for the incoming log message 1602. As indicated by block 1670, manager 26 and/or compute node 1302 creates a new cluster with a representative message equal to the incoming log message 1602. As indicated by block 1672, manager 26 and/or compute node 1302 persists, promulgates or adds the newly created cluster to the distributed persistent database 1154. As indicated by block 1674, manager 26 and/or computer node 1302 further indexes the incoming log message 1602 and the identifier of the newly created cluster as a document in the text search engine, such as Lucene, within persistent database 1154.

As indicated by block 1676, manager 26 and/or compute node 1302 further adds the newly created cluster to transient memory 1322. As indicated by block 1678, if the transient memory 1322 is full, manager 26 and/or compute node 1302 first evicts at least one infrequently used cluster family 852 from transient memory 1322 to make room for the newly created cluster. As indicated by block 1680, the incoming log message 1602 is assigned to the new cluster and compute node 1302 proceeds with operation 1222 for the next incoming log message 1602.

As the number of newly created clusters in persistent database 1154 increases, the grouping or merging of clusters in persistent database 1154 may be triggered. Examples of criteria which may trigger the grouping, merging and reconciliation of clusters are described above with respect to block 46. For example, in one implementation, such merging or grouping may be automatically periodically triggered, wherein such group clustering is carried out off-line, while compute nodes 1302, 1304 and 1306 continue to receive and analyze incoming log event messages. In another implementation, the trigger event 46 may be based upon a threshold number of clusters existing across different transient. In still other implementations, other events or circumstances may be used as a basis for triggering method 1700.

As indicated by blocks 1724 and 1726, for each or parent cluster N of each family 852 in distributed persistent database 1154, manager 26 compares the representative message of the particular cluster N to the other clusters N of the other families 852 according to an order sensitive cosine similarity function. In one implementation, the order in which the other parent clusters and of the different families are analyzed is based upon age, oldest to youngest. As indicated by block 1728, for each of the other parent clusters N of the other families 852, manager 26 first determines whether the particular cluster N being examined is the "same" cluster as the other cluster N. If the particular cluster N and the other parent cluster of the other families are the "same" (with the same representative message or separated a distance within a first order sensitive cosine threshold distance for belonging to the same cluster), manager 26 proceeds with block 1730.

As indicated by block 1730, manager 268 merges the two clusters and determines which of the two parent clusters is the oldest. The oldest parent cluster becomes a cluster while the younger cluster is deleted. The younger cluster's current count is merged with the older cluster and the younger clusters children (if any) become children of toe older cluster. Thereafter, manager 26 returns to block 1724, comparing the next cluster N in persistent database 1154.

As indicated by block 1732, if the particular cluster N is not the "same" as any of the other parent clusters N of the different families 852, manager 26 determines whether the particular cluster N being examined falls within a second order sensitive cosine threshold, larger than the first order sensitive cosine threshold, indicating that the two clusters are similar to one another. As indicated by block 1734, in response to determining that the particular cluster N being examined is similar to one of the other clusters N in the distributed database (falling within a threshold distance indicating similarity), manager 26 merges the two clusters and determines which the two clusters is oldest. The oldest cluster of the two clusters becomes a parent cluster. The younger cluster of the two clusters becomes a child of the older cluster. Any younger cluster's ancestors or descendents (parents and children), if any, become children of the older cluster. Thereafter, manager returns to block 1724, comparing the next cluster N in the persistent database 1154. As indicated by block 1740, after all of the clusters N have been compared to one another and merged as appropriate, manager 26 persists for promulgates the changes in merged clusters to database 1154.

Although the present disclosure has been described with reference to example implementations, workers skilled in the art will recognize that changes may be made in form and detail without departing from the spirit and scope of the claimed subject matter. For example, although different example implementations may have been described as including features providing benefits, it is contemplated that the described features may be interchanged with one another or alternatively be combined with one another m the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A system comprising:
   a cluster dictionary comprising a plurality of cluster families of event messages, wherein each cluster family includes a plurality of message clusters that overlap each other to be grouped together as a single cluster family; and
   a processor to:
     receive a first new event message associated with a first computer system event log;
     select a most active cluster family from the plurality of cluster families to compare with the first new event message, wherein the most active cluster family is a cluster family that receives event messages at a highest rate over a predetermined period of time compared to other cluster families;
     compare the first new event message to each message cluster in the most active cluster family, in an order from an oldest-created message cluster to a youngest-created message cluster, until a match between the first new event message and a particular message cluster in the most active cluster family is identified; and
     upon identifying the match between the first new event message and the particular message cluster in the most active cluster family, assign the first new event message to the particular message cluster in the most active cluster family.

2. The system of claim 1, wherein the processor:
   in response to a determination that the first new event message does not match any message clusters of the most active cluster family, selects a next most active cluster family from the plurality of cluster families to compare with the first new event message.

3. The system of claim 1, wherein the processor:
   in response to a determination that the first new event message does not match any message clusters of the plurality of cluster families, creates a new message cluster based on the first new event message.

4. The system of claim 1, wherein the system further comprises:
   a transient memory to store the plurality of cluster families of the cluster dictionary;
   a persistent memory to store additional cluster families of the cluster dictionary; and
   the processor to:
     in response to a determination that the first new event message does not match any message clusters of the plurality of cluster families in the transient memory, retrieve a subset of the additional cluster families from the persistent memory to compare with the first new event message;
     select an oldest-created cluster family from the subset of the additional cluster families;
     compare the first new event message to each message cluster in the oldest-created cluster family, in an order from an oldest-created message cluster to a youngest-created message cluster, until a match between the first new event message and a given message cluster in the oldest-created cluster family is identified; and
     upon identifying the match between the first new event message and the given message cluster in the oldest-created cluster family, assign the first new event message to the given message cluster.

5. The system of claim 4, wherein the processor:
   receives a second new event message associated with a second computer system event log;
   compares the second new event message to each message cluster of the plurality of cluster families stored in the transient memory;
   in response to the second new event message not being assigned to any message clusters of the plurality of cluster families stored in the transient memory, selects the subset of the additional cluster families from the persistent memory;
   compares the second new event message to each message cluster of the subset of the additional cluster families to provide a comparison result; and
   determines an assignment for the second new event message based on the comparison result.

6. The system of claim 5, wherein the processor creates a new message cluster in the persistent memory based on the comparison result.

7. The system of claim 5, wherein the processor selects the subset of the additional cluster families based on a result of a text search.

8. The system of claim 1, wherein the most active cluster family includes a first message cluster and a second message cluster, and the processor:
   compares the first message cluster to the second message cluster to provide a comparison result; and
   merges the first message cluster and the second message cluster into a single combined message cluster based upon the comparison result.

9. A method comprising:
   storing a plurality of cluster families of event messages of a cluster dictionary in a transient memory, wherein each cluster family includes a plurality of event message clusters that overlap each other to be grouped together as a single cluster family;
   receiving a new event message associated with a first computer system event log;
   selecting, by a processor, a most active cluster family from the plurality of cluster families to compare with the new event message, wherein the most active cluster family is a cluster family that receives event messages at a highest rate over a predetermined period of time compared to other cluster families;
   comparing, by the processor, the new event message to each message cluster in the most active cluster family, in an order from an oldest-created message cluster to a youngest-created message cluster, until a match between the new event message and a particular message cluster in the most active cluster family is identified; and upon identifying the match between the new event message and the particular message cluster in the most active cluster family, assigning, by the processor, the new event message to the particular message cluster in the most active cluster family.

10. The method of claim 9, further comprising:
in response to a determination that the new event message does not match any message clusters in the most active cluster family, select a next most active cluster family from the plurality of cluster families to compare with the new event message.

11. The method of claim 10, further comprising:
comparing the new event message to each message cluster in the next most active cluster family, in an order from an oldest-created message cluster to a youngest-created message cluster in the next most active cluster family, until a match between the new event message and a given message cluster in the next most active cluster family is identified.

12. The method of claim 9, further comprising:
in response to a determination that the new event message does not match any message clusters in the plurality of cluster families, creating a new message cluster based on the new event message.

13. The method of claim 9, further comprising:
storing additional cluster families of event messages of the cluster dictionary in a persistent memory; and
in response to a determination that the new event message does not match any message clusters of the plurality of cluster families in the transient memory, retrieving a subset of the additional cluster families from the persistent memory to compare with the new event message.

14. The method of claim 9, wherein the most active cluster family includes a first message cluster and a second message cluster, and wherein the method further comprises:
comparing the first message cluster to the second message cluster to provide a comparison result; and
merging the first message cluster and the second message cluster into a single combined message cluster based on the comparison result.

15. A non-transitory computer-readable medium storing instructions that, when executed by a processor, cause the processor to:
group a plurality of event messages of a cluster dictionary into a plurality of cluster families of event messages, wherein each cluster family of the plurality of cluster families includes message clusters that overlap each other to be grouped together as a single cluster family;
receive a new event message;
select a most active cluster family from the plurality of cluster families to compare with the new event message, wherein the most active cluster family is a cluster family that receives the plurality of event messages at a highest rate over a predetermined period of time compared to other cluster families;
compare the new event message to each message cluster in the most active cluster family, in an order from an oldest-created message cluster to a youngest-created message cluster, until a match between the new event message and a particular message cluster in the most active cluster family is identified; and
upon identifying the match between the new event message and the particular message cluster in the most active cluster family, assign the new event message to the particular message cluster in the most active cluster family.

16. The non-transitory computer-readable medium of claim 15, wherein the instructions cause the processor to:
in response to a determination that the new event message does not match any message clusters in the most active cluster family, select a next most active cluster family from the plurality of cluster families to compare with the new event message.

17. The non-transitory computer-readable medium of claim 15, wherein the instructions cause the processor to:
in response to a determination that the new event message does not match any event message clusters in the plurality of cluster families, create a new message cluster based on the new event message.

18. The non-transitory computer-readable medium of claim 15, wherein the plurality of cluster families are stored in a transient memory, and wherein the instructions cause the processor to:
store additional cluster families of event messages in a persistent memory;
in response to a determination that the new event message does not match any message clusters in the plurality of cluster families stored in the transient memory, retrieve a subset of the additional cluster families from the persistent memory;
select an oldest-created cluster family of the subset of the additional cluster families;
compare the new event message to each message cluster in the oldest-created cluster family of the subset of the additional cluster families, in an order from an oldest-created message cluster to a youngest-created message cluster, until a match between the new event message and a given message cluster in the oldest-created cluster family of the subset of the additional cluster families is identified; and
upon identifying the match between the new event message and the given message cluster in the oldest-created cluster family of the subset of the additional cluster families, assign the new event message to the given message duster.

19. The non-transitory computer-readable medium of claim 15, wherein the most active cluster family includes a first message cluster and a second message cluster, and wherein the instructions cause the processor to:
compare the first message cluster to the second message cluster to provide a comparison result; and
merge the first message cluster and the second message cluster into a single combined message cluster based on the comparison result.

* * * * *